April 16, 1929.  H. JUNKERS  1,709,620

SIGNALING AND PROJECTING IMAGES ON AERIAL CRAFT

Filed Oct. 5, 1925

Inventor:
Hugo Junkers
by
Atty.

Patented Apr. 16, 1929.

1,709,620

UNITED STATES PATENT OFFICE.

HUGO JUNKERS, OF DESSAU, GERMANY.

SIGNALING AND PROJECTING IMAGES ON AERIAL CRAFT.

Application filed October 5, 1925, Serial No. 60,694, and in Germany March 21, 1925.

My invention refers to the signaling and to the projecting of images in the dark on aerial craft and more especially on flying machines. It is an object of my invention to provide means whereby the signaling and projecting of images on board a flying machine or other aerial craft can be effected in an easier and more convenient manner and with less cost and expenditure of power than was hitherto possible.

In signaling from aerial craft in the dark it has been customary to produce light signals by means of small incandescent lamps mounted on or below the craft, rows of such lamps being arranged to form the contour of the signals, letters, figures or the like. By means of switches, signals, letters, figures and the like can be made to appear and disappear in any desired sequence. However, this method of signaling involves the disadvantage that separate frames must be mounted on the outer surfaces of the craft to carry the lamps. In the majority of cases such frames can be mounted on the craft only where this latter has been specially designed for this purpose. Moreover these frames and the necessary accessories, including the dynamo, motor, and switching means are very heavy and the number and configuration of the different signals is only a limited one.

According to the present invention I obviate these drawbacks by producing the signals, letters, numerals etc. or entire images by projection on the outer surface of the craft and more particularly on the bottom surfaces of the bearing planes of flying machines. I thereby obtain the advantage that all heavy and cumbrous frames for the support of incandescent lamps and the like can be dispensed with, the signals or images being directed directly on to the bottom surface of a bearing plane or on to a light and thin covering consisting of tissues or the like. I am thereby enabled to rapidly and easily change these signals and images in the simplest manner by merely replacing the lantern slides inserted in the projection apparatus.

This apparatus can be mounted on any suitable point of the craft in such manner that the bundle or bundles of light rays are projected on to a surface of the craft which is visible from without and preferably from below. In order to facilitate the handling of the apparatus and at the same time protect it against the influences of the weather and the like, I prefer mounting it within the body or hull of the craft, mirrors or the like being provided which serve for reflecting the rays projected thereon by the projection apparatus so that these rays compose on the bearing plane or other surface the signals or images desired. In flying machines I prefer arranging the projection apparatus in the hull or body in such manner that the bundle of light rays is directed obliquely downwards, mirrors being arranged at a point below the hull or laterally thereto, for instance on the landing gear in such manner that the light emitted by the projection apparatus is reflected on to the bottom surface of the hull or the bearing planes.

In those cases, where the outer surfaces of the craft are too uneven or offer other obstacles to a perfect rendering of the signals or images, I cover them with a special coating or cover well adapted for use as a projection screen, thereby obtaining a powerful reproduction without any disturbing reflection and the like.

In the drawings affixed to this specification and forming part thereof my invention is illustrated diagrammatically by way of example as applied to a flying machine of the monoplane type.

In the drawings

Figure 1:
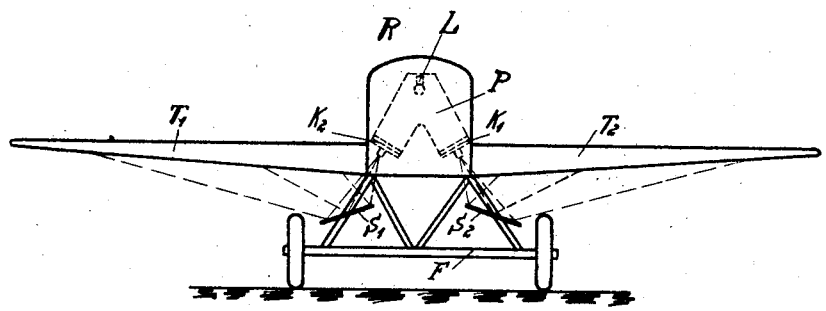
Fig. 1 is an end view.
Figure 2:
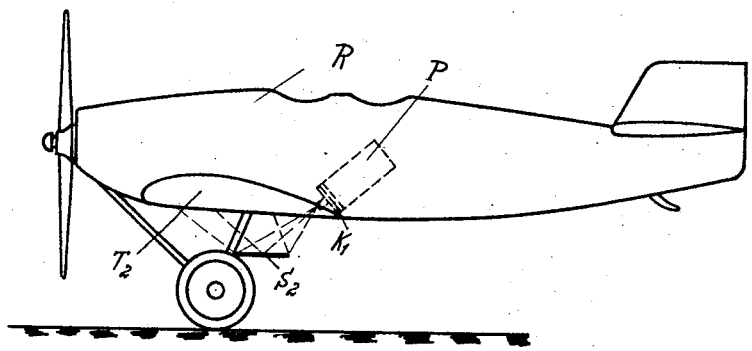
Fig. 2 is a side elevation.

Referring to the drawings, R is a hull or body and P is the projection apparatus, comprising a single source of light L and two optical systems $K^1$, $K^2$ set at an angle to each other and capable of projecting the light emitted by the lamp L obliquely downwards. To the landing gear F are fixed mirrors $S^1$ and $S^2$ in such position that the bundles of light rays projected by the optical systems $K^1$, $K^2$ are reflected on to the bottom surface of the bearing planes $T^1$ and $T^2$, whereby the signals or images can easily be observed from below. This arrangement enables me to project different signals or images on the two bearing planes, but obviously, by employing a single optical system and a single mirror of angular cross-section, I can also produce one and the same signal or image on the two surfaces.

I wish it to be understood that I do not desire to be limited to the exact details of construction shown and described for obvious modifications will occur to a person skilled in the art.

I claim:—

Flying machine comprising a fuselage, a bearing plane, a projection apparatus mounted in said fuselage comprising a single source of light and two optical systems directed downwards at an angle to each other and a mirror below each optical system in a position to reflect the image onto a bearing plane.

In testimony whereof I affix my signature.

HUGO JUNKERS.